United States Patent Office 2,790,831
Patented Apr. 30, 1957

2,790,831

IMPROVEMENTS IN NITRATING 1-NAPHTHYLAMINE

Anthony F. Finelli, Akron, Ohio, assignor, by mesne assignments, to The Goodyear Tire & Rubber Company, a corporation of Ohio No Drawing. Application June 24, 1953,
Serial No. 363,920

7 Claims. (Cl. 260—578)

This invention relates to a method for the nitration of alpha-naphthylamine.

In the nitration of alpha-naphthylamine the nitro group attaches primarily to the 5 and secondarily to the 8 position, a separation procedure, therefore, being necessary since the two isomers possess different properties. In addition, since the nitration reaction is exothermic, the yield of nitronaphthylamine produced by known processes has been comparatively low and the products have not been particularly pure because of the formation of tarry by-products which result from oxidation and condensation side reactions.

It is, therefore, an object of this invention to provide a method for the nitration of alpha-naphthylamine which will result in increased yields. It is another object to provide increased yields while at the same time producing a product of higher purity. Still another object is to minimize the reaction time necessary to nitrate alpha-naphthylamine. Another object is to provide a method for the nitration of alpha-naphthylamine which is adaptable to continuous operation. Other objects will appear as the description proceeds.

The objects of this invention are accomplished by adding the nitrating agent to a solution of the alpha-naphthylamine, while maintaining the temperature of the reaction mixture between $-10°$ C. and $-25°$ C. and applying constant, vigorous, agitation to the reaction mixture to insure the immediate dispersion of the nitrating agent and intimate contact between the reactants and to provide for the dissipation of heat from the reaction mixture. The nitrating agent is a mixture of concentrated nitric acid and concentrated sulfuric acid. The solution of alpha-naphthylamine is conveniently prepared by dissolving the amine in concentrated sulfuric acid. After the addition of the nitrating agent is complete, the reaction mixture contains 5-nitro-1-naphthylamine and 8-nitro-1-naphthylamine both of which are promptly removed from the nitrating agent in order to minimize the formation of tarry by-products.

The 5-nitro-1-naphthylamine is separated from the reaction mixture in the form of its sulfate. The separation is conveniently achieved by pouring the reaction mixture over a bed of ice. The precipitate which forms is the 5-nitro-1-naphthylamine sulfate which is less soluble in the dilute acid than the 1-8 isomer. This precipitate is removed by filtration and then mixed with a neutralizing solution from which the precipitated amine is collected by filtration. The 8-nitro-1-naphthylamine is then separated from the mother liquor by neutralizing the mother liquor and collecting the precipitated 8-nitro-1-naphthylamine.

By carefully maintaining the temperature of the reaction mixture between $-10°$ C. and $-25°$ C. and by providing constant, vigorous agitation to the reaction mixture it has been discovered that the combined yields of the two isomers may be as high as 94% with the 8-nitro isomer being present in approximately one third of the total amount.

To insure increased yields of high purity product, it has been found desirable to remove the nitro-naphthylamines from the reaction mixture soon after the nitration reaction is completed. Failure to do so results in the formation of tars which reduce the yield and contaminate the purity of the finished products.

It should be appreciated that in the practice of this invention the provision of constant, vigorous agitation of the reaction mixture is of the utmost importance for the reason that if the nitric acid is not immediately mixed with and reacted with the naphthylamine the heat of reaction will cause local overheating of the reaction mixture which will permit the nitric acid to attack and oxidize the amine groups present. To aid in the mixing of the nitrating solution with the amine solution, it is preferred that the mixture of nitric acid of sulfuric acid be added in the form of a fine spray. In this manner a more complete and immediate mixture of the two reactants is possible.

The practice of this invention is illustrated by the following experimental example:

*Example 1*

Concentrated sulfuric acid (1750 milliliters) was placed in a baffled, 3-liter, 3-necked flask which was equipped with a high speed mechanical stirrer. The sulfuric acid was cooled to $-5°$ C. by means of an alcohol acetone bath. To the cooled acid was then added 200 grams of powdered alpha-naphthylamine. The amine was added slowly so that the temperature did not rise above $-5°$ C.

To the amine solution was then added a mixture of concentrated nitric acid (135 grams) and concentrated sulfuric acid (250 milliliters). The temperature of the acid mixture was approximately $-5°$ C. The addition was gradual so as to maintain the temperature of the reaction mixture betwen $-12°$ C. and $-15°$ C. Vigorous agitation, so as to produce a splashing, foaming effect, was supplied during the time the nitrating solution was being added. The reaction mixture was then poured over chopped ice mixed with 4 grams of sodium hydrosulfite. After standing for 45 minutes the solution was filtered, leaving the precipitate of 5-nitro-1-naphthylamine sulfate. The precipitate was successively washed with: first, 3-N sulfuric acid; second, methyl alcohol; and finally, 1-N sulfuric acid, after which the precipitate was neutralized with ammonium hydroxide. The yield of 5-nitro-1-naphthylamine was 157 grams or 60.5 percent and had a melting point of 102–106° C.

The mother liquor from which the 5-nitro-1-naphthylamine had been removed was slurried with ice and made alkaline with concentrated ammonium hydroxide. From the alkaline solution 8-nitro-1-naphthylamine precipitated. The precipitate was separated by filtration. The yield of 8-nitro-1-naphthylamine was 87.4 grams or 33.2 percent and had a melting point of 88–89° C. The combined yield of the 5-nitro- and 8-nitro-1-naphthylamine was 93.7%.

The invention provides a process for the preparation of nitrated naphthylamines in high yield and of improved quality. The process is characterized by employment of maintained low temperatures, the temperature during the reaction not being allowed to rise above $-10°$ C. nor being permitted to go below $-25°$ C. and preferably being kept for the greater part of the time around $-15°$ C. This contrasts with previous methods in which the temperature has been allowed to rise above $-10°$ C. during the reaction. Temperatures above $-10°$ C., if allowed to prevail for any appreciable length of time, increase the formation of tars, and greatly reduce the yield. Temperatures below $-25°$ C. render the reaction mixture so viscous as to make the necessary, efficient agitation impractical. The new process includes vigorous and efficient agitation of the reaction mixture, to insure immediate contact of the reactants and to aid in the maintenance of the desired low, operating temperature. A further difference from prior art practices is found in the handling of the reaction mixture upon completion of the reaction, the present process calling for prompt separation of the nitrated naphthylamines, whereas earlier procedures called for long rest periods after the nitration had been accomplished.

The present process substantially eliminates the formation of tars and consequent loss of yield by strict maintenance of the reaction temperature below $-10°$ C., despite the exothermic nature of the reaction which tends to cause temperature rise; vigorous agitation and prompt removal of the nitrated product from the nitrating medium. By following these steps in the process of nitrating alpha-naphthylamine, the time required to nitrate is reduced so as to make possible the continuous nitration of alpha-naphthylamine.

The nitrated naphthylamines produced according to the method herein claimed have a variety of uses. They may be reduced to the diamines and as such employed as intermediates in the dye industry.

While certain representative embodiments of details have been shown for the purpose of illustrating the invention, it will be apparent to those skilled in this art that various changes and modifications may be made therein without departing from the spirit or scope of the invention.

I claim:

1. The method of nitrating 1-naphthylamine which comprises adding a mixture of concentrated nitric acid and concentrated sulfuric acid to a solution of 1-naphthylamine in concentrated sulfuric acid, maintaining the temperature of the reaction mixture between $-10°$ C. and $-25°$ C. while the reactants are being mixed together and providing constant, vigorous, agitation to the reaction mixture.

2. The method according to claim 1 in which the mixture of concentrated nitric acid and concentrated sulfuric acid is added to the naphthylamine solution in the form of a fine spray.

3. The method according to claim 1 in which 5-nitro-1-naphthylamine and 8-nitro-1-naphthylamine are promptly removed from the reaction mixture after the nitration reaction has been completed.

4. The method according to claim 1 in which the temperature of the reaction mixture is maintained at approximately $-15°$ C. until after the nitration has been completed.

5. The method according to claim 1 in which the mixture of acids added to the solution of naphthylamine is added at a temperature of approximately $-5°$ C.

6. In the nitration of 1-naphthylamine, the improvement which comprises maintaining all parts of the reaction mixture during the entire period of the nitration at a temperature not higher than $-10°$ C. and not lower than $-25°$ C.

7. The method of making 5-nitro-1-naphthylamine which comprises adding a mixture of concentrated nitric acid and concentrated sulfuric acid to a solution of 1-naphthylamine in concentrated sulfuric acid while maintaining all parts of the reaction mixture during the entire period of nitration at a temperature not higher than $-10°$ C. and not lower than $-25°$ C., promptly diluting the reaction mixture with cold water and separating the precipitated 5-nitro-1-naphthylamine from the diluted reaction mixture.

References Cited in the file of this patent

UNITED STATES PATENTS

| | | |
|---|---|---|
| 2,576,807 | Oesterein | Nov. 27, 1951 |

FOREIGN PATENTS

| | | |
|---|---|---|
| 57,491 | Germany | June 25, 1890 |

OTHER REFERENCES

Morgan et al.: "Chem. Abst." (1924), vol. 18, page 229.

Morgan et al.: Jour. of the Society of Chemical Ind., vol. 42 (July–December), 341–51 (1923).